United States Patent
Hiji et al.

(10) Patent No.: US 7,465,208 B2
(45) Date of Patent: Dec. 16, 2008

(54) METHOD FOR MANUFACTURING DISPLAY ELEMENT

(75) Inventors: Naoki Hiji, Kanagawa (JP); Shigeru Yamamoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 60 days.

(21) Appl. No.: 10/382,832

(22) Filed: Mar. 7, 2003

(65) Prior Publication Data

US 2004/0058612 A1 Mar. 25, 2004

(30) Foreign Application Priority Data

Sep. 20, 2002 (JP) .............................. 2002-276177

(51) Int. Cl.
*H01J 9/00* (2006.01)
*G02F 1/1333* (2006.01)

(52) U.S. Cl. .............................. 445/24; 349/86; 349/92

(58) Field of Classification Search ......... 349/187–192, 349/183–186, 86–92, 127, 133, 175, 179; 445/24, 25; 313/503–512, 496, 463, 466, 313/479, 495, 483, 553, 113; 427/58
See application file for complete search history.

(56) References Cited

U.S. PATENT DOCUMENTS

| | | | | |
|---|---|---|---|---|
| 3,578,844 A | * | 5/1971 | Churchill et al. | 349/21 |
| 3,585,381 A | * | 6/1971 | Hodson et al. | 349/21 |
| 4,356,429 A | * | 10/1982 | Tang | 313/503 |
| 4,877,697 A | * | 10/1989 | Vollmann et al. | 430/20 |
| 5,026,143 A | * | 6/1991 | Tanaka et al. | 349/143 |
| 5,115,329 A | * | 5/1992 | Ikarashi et al. | 349/69 |
| 5,418,094 A | * | 5/1995 | Sato et al. | 430/7 |
| 5,559,615 A | * | 9/1996 | Takei et al. | 349/70 |
| 5,652,067 A | | 7/1997 | Ito et al. | |
| 5,712,695 A | * | 1/1998 | Tanaka et al. | 349/79 |
| 5,771,084 A | * | 6/1998 | Fujimori et al. | 349/153 |
| 5,836,797 A | * | 11/1998 | Suzuki et al. | 445/24 |
| 6,002,383 A | | 12/1999 | Shimada | |
| 6,331,884 B1 | * | 12/2001 | Masazumi et al. | 349/156 |
| 6,628,347 B1 | * | 9/2003 | Oohata et al. | 349/25 |
| 6,812,636 B2 | * | 11/2004 | Porter et al. | 313/496 |
| 6,969,948 B2 | * | 11/2005 | Urabe et al. | 313/506 |

FOREIGN PATENT DOCUMENTS

JP A-06-209094 7/1994

(Continued)

*Primary Examiner*—Nimeshkumar D. Patel
*Assistant Examiner*—Anne M Hines
(74) *Attorney, Agent, or Firm*—Oliff & Berridge, PLC (57) ABSTRACT

A dispersion liquid including micro-capsules containing a cholesteric liquid crystal as a core material dispersed into a binder resin solution is applied to and dried on a substrate formed an electrode thereon to form a display layer. Then, a light shielding layer is formed and an adhesive layer is formed thereon. On the other hand, a photoconductive layer is formed on another substrate formed another electrode thereon. The substrate formed each layer thereon and the another substrate are bonded to form a display element. The light shielding layer 14 improves roughness on a surface of the display layer and the adhesive layer filled up the roughness. Even if the bubbles occur on a back face of the light shielding layer, the bubbles does not affect the display quality. Because the bubbles are unseen.

24 Claims, 7 Drawing Sheets

FOREIGN PATENT DOCUMENTS

| | | |
|---|---|---|
| JP | A-08-304850 | 11/1996 |
| JP | A-09-001963 | 1/1997 |
| JP | A-09-080221 | 3/1997 |
| JP | A-11-237644 | 8/1999 |
| JP | A-2001-075122 | 3/2001 |
| JP | A-2001-096998 | 4/2001 |
| JP | A-2001-105795 | 4/2001 |
| JP | A-2001-109074 | 4/2001 |
| JP | 2002-6342 | 1/2002 |
| JP | A-2002-196291 | 7/2002 |

* cited by examiner

BONDING

BONDING

BONDING

BONDING

BONDING

BONDING

FIG. 7 (C)

*(RELATED ART)*

(RELATED ART)

METHOD FOR MANUFACTURING DISPLAY ELEMENT

The present disclosure relates to the subject matter contained in Japanese Patent Application No. 2002-276177 filed on Sep. 20, 2002, which is incorporated herein by reference in its entirety.

BACKGROUND OF THE INVENTION

1. Field of the Invention

The present invention relates to a display element for displaying and recording an image, a document, and code information such as bar code and performing an optical information processing such as light modulation and optical switching using an optical change such as light transmission, light reflection, and light refraction, and a manufacturing method therefor.

2. Description of the Related Art

Conventionally, various display elements using a liquid display material such as a liquid crystal display element and an electrophoresis display element have been employed. To put such a display element into practical use, it is required to have a process of enclosing a display material into a "container" like a pair of substrates with the periphery sealed. Therefore, a process of forming the container, and a process of enclosing the display material into the container are required. For example, it takes several to several tens hours to make a filling process of the liquid crystal material in the liquid crystal display element, leading to a main cause of impeding the productivity.

In these display elements, it has been required to place a spacer member in a display layer to make the thickness of the display layer constant. Also, it has been required to form a flow preventing partition for preventing the flow of the display material owing to an external pressure or the maldistribution of the display material caused thereby. Therefore, there has been a problem that number of members and number of manufacturing processes are increased to raise the cost.

On one hand, a display element of binder dispersion type is well known in which a display material is dispersed into the binder and held. As one example, micro-capsules carrying the display material are dispersed into the binder material such as resin. For example, there are an electrophoresis display element in which an insulating oil containing colored charged particles is enclosed into micro-capsules, a magnetophoresis liquid crystal element in which an insulating oil containing magnetic particles is enclosed into micro-capsules, and a liquid crystal element in which a liquid crystal material is enclosed into micro-capsules. As another example, a display material treated in a liquid is dispersed into a solution of binder material incompatible with the display material and applied and dried. For example, there is a liquid crystal element in which a liquid crystal material is dispersed into an aqueous solution of water soluble resin, applied and dried. As a further example, a binder material and a display material are dissolved uniformly, using solving means such as a solvent or heating, and then an external stimulus such as heat or light is applied to cause the phase separation of the display material and the binder. For example, there are well known a liquid crystal display element of polymer dispersed type in which a resin and a liquid crystal material are phase separated from a cosolvent solution by solvent drying, and a liquid crystal display element of polymer dispersed type that is produced by separating a photochemical polymerization phase from a mixed solution of a photochemical polymerization monomer and the liquid material.

The above display element of binder dispersion type is obtained in the form in which the display material is dispersed into and enclosed in the binder solution. Therefore, there is no need for a process of forming the container and a process of enclosing the display material into the container. Also, since the thickness is kept owing to the strength of binder, there is no need for disposing a spacer. Furthermore, since the binder acts as a partition wall, there is no need for forming the flow preventing wall. Therefore, the construction is simplified, the number of manufacturing processes is reduced, and the cost is lowered.

In this display element of binder dispersion type, it is common to form a display layer by applying a binder solution having the display material dispersed on a substrate. To protect this applied face, another substrate may be bonded on the display layer. Particularly, when the display material is a material of voltage response type and it is desired to display in a desired or arbitrary pattern, the display layer may be held between a pair of substrates having a transparent conductive film such as ITO (Indium Tin Oxide) formed as an electrode to apply a voltage to the display layer. In this case, first of all, the display layer is applied to and formed on one substrate with electrode, and then the other substrate with electrode is bonded thereon to produce the display element.

Figure 9:
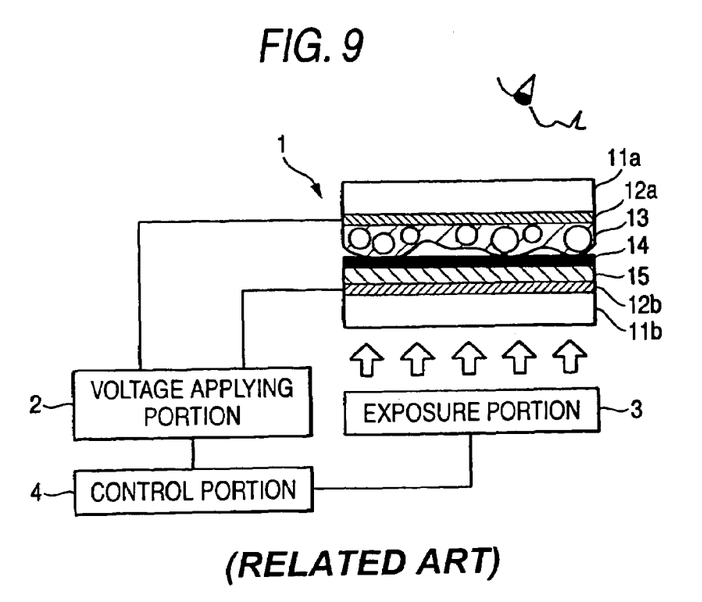
FIG. 9 is a cross-sectional view showing one example of the conventional display element.

FIG. 9 is a cross-sectional view showing one example of a display element according to the related art. In FIG. 9, reference numeral 1 denotes a display element, 2 denotes a voltage applying portion, 3 denotes an exposure portion, 4 denotes a control portion, 11a, 11b denote substrates, 12a, 12b denote electrodes, 13 denotes a display layer, 14 denotes a light shielding layer, and 15 denotes a photoconductive layer. In FIG. 9, as one example of the display element according to the related art, a display element of optically writing type using a cholesteric liquid crystal is shown. The display element with this construction is disclosed in JP-A-2002-6342.

The display element 1 has a plurality of display function layers carried by the pair of substrates 11a and 11b to implement the display function. In this example, the display function layers include the electrode 12a, the display layer 13, the light shielding layer 14, the photoconductive layer 15 and the electrode 12b, which are provided in this order. The light shielding layer 14 is provided to shield a transmitted light from the back side thereof and prevent a display contrast ratio from being lowered, in a display element of reflection type for displaying with the reflection of external light or a display element of spontaneous emission type. Also, in this example, the photoconductive layer 15 is provided as a switching layer for switching a display mode, as will be described later.

The voltage applying portion 2 is connected between the electrodes 12a and 12b. The exposure portion 3 for illuminating a light image of an image or characters is disposed facing the photoconductive layer 15. The control portion 4 controls the voltage applying portion 2 and the exposure portion 3 so that a voltage is applied in synchronization with exposure.

This display element 1 operates as follows. The voltage applying portion 2 applies a voltage between the electrodes 12a and 12b, while the exposure portion 3 applies a light image to the photoconductive layer 15. Then, a voltage divided by the display layer 13, the light shielding layer 14 and the photoconductive layer 15 is applied to the display layer 13 having a liquid crystal. At this time, an electrical resistance value of the photoconductive layer 15 varies at different positions, depending on the light intensity of the light image. That is, the resistance is low at a position where the applied light intensity is strong, while the resistance is high at a position where the light intensity is weak. In response thereto, the divided voltage on the display layer 13 is high at the position where the light intensity is large, while the divided voltage on the display layer 13 is small at the position where the light intensity is weak, thereby causing a change in the orientation of liquid crystal, which appears as a change in the reflection factor. The cholesteric liquid crystal has a memory property of retaining the display even after removal of the voltage. Therefore, this display element acts as a display and recording element.

Figure 10:
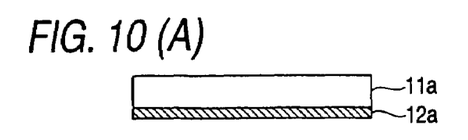
FIGS. 10(A)-10(F) are explanatory diagrams for explaining a manufacturing process of a conventional display element.

FIG. 10 is an explanatory diagram for explaining one example of the manufacturing process for the display element according to the related art. The display element 1 as shown in FIG. 9 is produced in accordance with the following procedure. First of all, the electrode 12a is formed on the substrate 11a, as shown in FIG. 10(A). Then, a dispersion liquid containing micro-capsules including cholesteric liquid crystal as the core material that are dispersed into a binder resin solution is applied to and dried on the substrate 11a with the electrode 12a formed thereon, to form the display layer 13, as shown in FIG. 10(B).

On the other hand, the electrode 12b is formed on the substrate 11b, as shown in FIG. 10(C). An organic photoconductive material solution is applied thereon to form the photoconductive layer 15, as shown in FIG. 10(D). Subsequently, a dispersion liquid having a black coloring matter dispersed into the binder resin solution is applied to form the light shielding layer 14, as shown in FIG. 10(E). An adhesive, not shown, is coated around the periphery of the substrate to bond the substrate 1a of FIG. 10(B) and the substrate 1b of FIG. 10(E) to produce the display element 1 as shown in FIG. 10(F).

In this manufacturing process, particles of the dispersed display material is reflected such that the display layer 13 of binder dispersion type as shown in FIG. 10(B) has roughness on the surface. Therefore, air bubbles caused by the roughness on the surface may remain when bonding the substrate 11a and the substrate 11b. The remaining bubbles reflect light to lower the display contrast ratio and/or to increase the image noise, resulting in a problem that the display quality is degraded.

The roughness on the surface of the display layer can be relieved to some extent by increasing a mixture ratio of binder to the display material and/or reducing the particle diameter of dispersed display material. However, if the mixture ratio of binder is increased, the voltage (driving voltage) required for the display is caused to increase. Also, even if the particle diameter of display material is smaller, there is a limitation in relieving the roughness. Because it is necessary to have the particle diameter of at least several μm or greater to obtain an excellent display contract ratio using the cholesteric liquid crystal. Furthermore, a flattening layer for filling up the roughness on the display layer 13 may be possibly formed. For example, adhesives may fill up the roughness. However, considerable film thickness is required to provide the flattening layer. Although there is an effect for relieving the roughness, there is a problem of increasing the driving voltage as with the case where the mixture ratio of binder is increased.

SUMMARY OF THE INVENTION

The present invention has been achieved in the light of the above-mentioned problems. It is an object of the invention to provide a display element and a manufacturing method therefor in which degradation in display quality due to remaining air bubbles caused at a time of bonding a substrate on a display layer of binder dispersion type is prevented in.

According to an aspect of the invention, a method for manufacturing a display element including a first substrate, a second substrate disposed to be opposite to the first substrate, and a plurality of display function layers for implementing a display function is provided. The display function layers have a display layer in which a display material is dispersed into a binder. The display function layers are disposed between the first substrate and the second substrate. The method includes forming the display layer directly on the first substrate or via one or more display function layers other than the display layer on the first substrate, forming other one or more display function layers on the display layer, forming a display function layer on the second substrate other than the display function layer formed on the first substrate, if necessary, and bonding the first substrate after lamination to the second substrate.

Also, according to another aspect of the invention, a display element is provided. The display element includes a first substrate, a second substrate disposed to be opposite to the first substrate, and a plurality of display function layers for implementing a display function. The display function layers have a display layer in which a display material is dispersed into a binder. The display function layers are disposed between the first substrate and the second substrate. The one or more display function layers are laminated on the first substrate. The display function layers are laminated on the second substrate, if necessary. Thereafter, an adhesive layer bonds the first substrate and the second substrate. One or more display function layers other than the display layer are provided between the display layer and the adhesive layer.

With this invention, since one or more display function layers other than the display layer are formed on the display layer, the display function layers on the display layer act as the flattening layers for flattening the roughness on the surface of the display layer to decrease the roughness on the bonded face and prevent air bubbles from being mixed. Thereby, the reflection of light due to bubbles having different refractive index is suppressed, so that the display contrast ratio is not decreased or the image noise is relieved to enhance the display quality.

The air bubbles cause a variation in divided voltage on the display layer, and may be observed as uneven display, when the voltage is applied to the display layer. Therefore, remaining bubbles on the bonded face between the display function layer formed on the display layer and the second substrate are desirably reduced to the least. From this viewpoint, an adhesive layer may be provided on this bonded face. This adhesive layer fills up the roughness on the bonded face to reduce the remaining bubbles and prevent the reflection of light due to bubbles. Also, the adhesive layer not only reduces the remaining bubbles but also fills up the roughness of the display layer, with the action of reducing a variation in the divided voltage. This is because the variation in the divided voltage is reduced with the greater dielectric constant of the dielectric substance (here, bubbles and the adhesive layer) inserted in series, and the dielectric constant of the adhesive constituting the adhesive layer is usually three or more, which is above the dielectric constant (=1) of bubbles. Moreover, since another display function layer is formed on the display layer to decrease the roughness, the film thickness of the adhesive layer is smaller, making it possible to suppress the increase in the driving voltage to the minimum.

The display function layer formed on the display layer may be the light shielding layer. By forming the light shielding layer on the display layer, the light shielding layer and the display layer are intimately contacted to prevent the bubbles from remaining on the surface of the display layer. Though bubbles may remain between the light shielding layer and the second substrate, the bubbles are hidden under the light shielding layer as seen from the observer, who can not observe the scattered light due to bubbles. Therefore, it is possible to prevent the degradation in the display quality from being caused by the bubbles. Also, the light shielding layer acts as the flattening layer for flattening the roughness on the surface of the display layer, thereby decreasing the roughness on the bonded face and preventing the bubbles from being mixed.

The light shielding layer is formed at high productivity by coating an aqueous coating agent with the black coloring matter dispersed or dissolved in the binder solution. Typically, the display material is often subject to physical or chemical damages from the solvent of binder resin, whereby the selection of the solvent or dispersion medium is important. As a result of examining various solvents, it has been found that the use of an aqueous coating agent containing at least 50% or more of water is effective to reduce the damages.

The above construction of the invention is particularly effective for the display element in which the display layer is formed with micro-capsules enclosing the display material such as cholesteric liquid crystal dispersed into the binder. Also, in constituting the display element of optically writing type, after the switching layer for switching the display mode is formed the second substrate, the second substrate is bonded with the first substrate after lamination to produce the display element.

DETAILED DESCRIPTION OF THE PREFERRED EMBODIMENTS

First Embodiment

Figure 1:
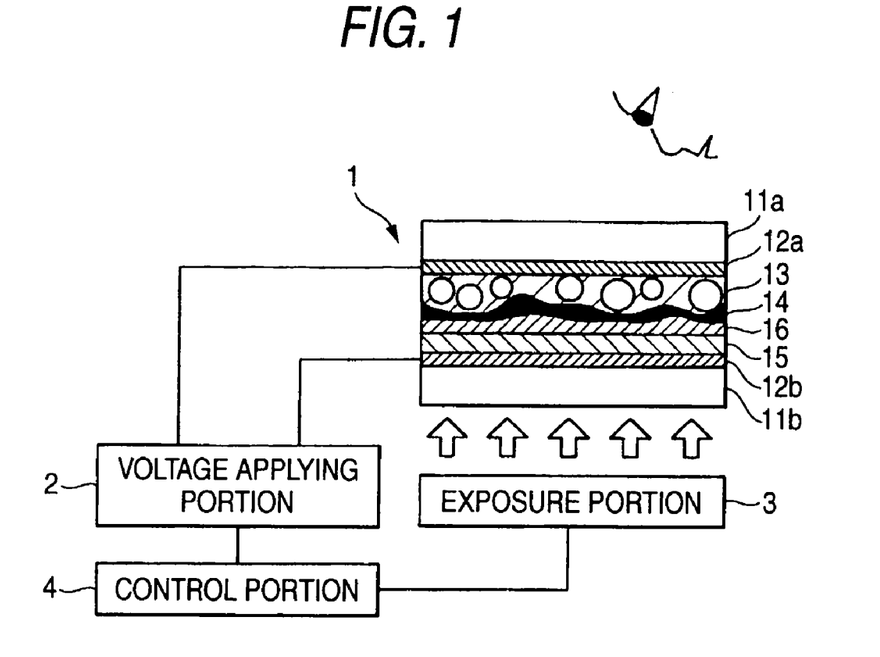
FIG. 1 is a cross-sectional view showing a display element according to a first embodiment of the present invention.

FIG. 1 is a cross-sectional view showing a display element according to a first embodiment of the present invention. In FIG. 1, the same or like parts are designated by the same numerals as in FIG. 9, and the duplicate description maybe omitted. Reference numeral 16 denotes an adhesive layer. In this embodiment, a display element of optically writing type using a cholesteric liquid crystal is described as one example of the display element.

The display element 1 has a plurality of display function layers carried by a pair of substrates 11a and 11b to implement the display function. In this example, an electrode 12a, a display layer 13, a light shielding layer 14, an adhesive layer 16, a photoconductive layer 15 and an electrode 12b are provided in this order as the display function layers. Other outside construction and the operation principle are the same as for the display element according to the related art as described with reference to FIG. 9.

Figure 2:
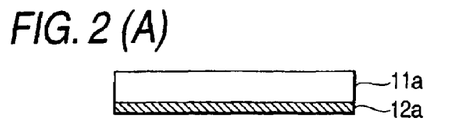
FIGS. 2(A)-2(G) are process flow diagrams showing a manufacturing process of the display element according to the first embodiment of the invention.

FIG. 2 is a process flow diagram showing a manufacturing process of the display element according to the first embodiment of the invention. First of all, the electrode 12a is formed on the substrate 11a, as shown in FIG. 2(A) Alternatively, the substrate 11a with the electrode 12a formed in advance maybe employed. Then, a dispersion liquid in which micro-capsules including a cholesteric liquid crystal as the core material are dispersed into a binder resin solution is applied to and dried on the substrate 11a with the electrode 12a formed to form the display layer 13, as shown in FIG. 2(B). Then, the light shielding layer 14 is formed as shown in FIG. 2(C). The adhesive layer 16is formed thereon as shown in FIG. 2(D).

On the other hand, the electrode 12b is formed on the substrate 11b, as shown in FIG. 2(E), or the substrate 11b with the electrode 12b formed beforehand may be employed. Then, the photoconductive layer 15 is formed thereon, as shown in FIG. 2(F). The substrate 11a of FIG. 2(D) and the substrate 11b of FIG. 2(F) are bonded as shown in FIG. 2(G) to produce the display element 1 as shown in FIG. 1.

The display element and its manufacturing method of the invention as shown in FIGS. 1 and 2 will be described below in detail. The substrate 11a on a display reference side may be a transparent sheet or a film having an appropriate strength. The transparency of the substrate 11a is desired from the requirement of observing the display layer. The strength of the substrate 11a is required for the substrate 11a to act as a support member of the display layer during the manufacturing process and during the use. When a voltage applying region is defined by forming the electrode on the substrate 11a, the substrate 11a must be an insulator. The materials of the substrate 11a may include resins such as polyethylene terephthalate (PET), polycarbonate, polyether sulfone, triacetyl cellulose, polyolefine, polyester, polyacrylate, and polymethacrylate, glasses such as soda glass and boro-silicate glass, and ceramics such as alumina and PLZT.

The substrate 11b on the back side is provided for protection of the display layer 13 and as a support of the electrode 12b for applying the voltage. The substrate 11b may be a sheet or film having an appropriate strength. In this case, owing to the demand of exposing the photoconductive layer 15, the substrate 11b is also made of a transparent material, but may not be transparent if there is no such demand (e.g., applying light from the front face). The materials of the substrate 11b may include transparent materials such as resin, glass and ceramics, and opaque materials such as a metal plate and a metal foil, if it may not be transparent.

In this embodiment, if it is necessary to apply a voltage to the display layer 13, the electrode 12a may be formed in advance on the substrate 11a before forming the display layer 13. In this case, the electrode 12 needs to be transparent like the substrate 11a. The materials of the electrode 12a may include thin metal films such as Au and Al, conductive oxides such as $In_2O_3$, $SnO_2$, and ZnO, and conductive polymer such as polypyrrole. The materials of the electrode 12b may be the same as those of the electrode 12a. However, if the translucent property is not specifically required as with a case of the back substrate 11b, opaque materials such as a thick metal film and a carbon electrode, which can not transmit the light, may be employed.

The display layer 13 is a composite material in which the display material is dispersed into the binder in this invention. The display layer 13 of this construction has roughness on its surface due to particles of dispersed display material, thereby enjoying the effect of the invention. The display material has the variable optical properties of transmittance, reflectance, polarized state, color and brightness due to an external stimulus such as an electric field, a magnetic field, heat and light, and may be any of well-known materials including a liquid crystal material, an electrophoresis material in which colored charged particles are dispersed into insulation oil, a magnetophoresis material, an electroluminescence material, an elecrochlomic material, a photoluminescence material, a photochlomic material, and a thermochlomic material.

The liquid crystal materials, especially the cholesteric liquid crystal material, is particularly useful, because it can easily produce arbitrary display colors, and has a memory property. The cholesteric liquid crystal material has an optically active liquid crystal composition, and is obtained by
1) adding an optically active compound called a chiral agent to nematic liquid crystal composition, or
2) using a liquid crystal composition that is optically active by itself, like cholesterol derivatives.

In the case 1), examples of the nematic liquid crystal composition may include cyanobiphenyl series, phenylcyclohexane series, phenylbenzoate series, cyclohexylbenzoate series, azomethine series, azobenzene series, pyrimidine series, dioxane series, cyclohexylcyclohexane series, stilbene series, and tolan series, which are well known. The chiral agent may be a compound having an optically active group such as cholesterol derivative or 2-methylbutyl group.

An addition agent such as coloring matter or particulate may be added to the liquid crystal material. The liquid crystal material may be gelatinized using a crosslinking polymer or a hydrogen bonding gelling agent. The liquid crystal material may be a high molecular, medium molecular, or low molecular liquid crystal, or a mixture thereof.

The cholesteric liquid crystal presents a color by a kind of Bragg reflection called a "selective reflection". A selective reflection wavelength is equal to the product of a helical pitch and an average refractive index of the cholesteric liquid crystal. Therefore, a desired reflection color can be easily obtained by appropriately adjusting a composition ratio of the cholesteric liquid crystal composition to change the helical pitch. Also, the cholesteric liquid crystal can easily change the direction of a helical axis by applying an electric field. That is, the cholesteric liquid crystal is placed in a planar orientation with the helical axis almost parallel to the normal of the display layer by applying a high voltage pulse, and changed to a focal conic orientation with the helical axis almost vertical to the normal of the display layer by applying a low voltage pulse. Since the selective reflection occurs only at the time of planar orientation, the reflection factor can be adjusted by controlling the direction of the helical axis with the voltage.

The display material may be in a solid phase or a liquid phase. The display material may be isolated and dispersed in the binder or communicate to make a continuous phase in the binder. However, if there are any liquid components on the surface of the display layer 1, the light shielding layer is difficult to form, whereby at least the surface is preferably covered with the solid phase. Roughness appearing on the surface of the display layer 13 depend on the particle diameter of dispersed display material, and tend to increase as the particle diameter is greater. Therefore, air bubbles at the time of bonding are more conspicuous if the particle diameter is greater. The particle diameter that is problem with air bubbles is typically about 1 μm or more in the volume average particle diameter.

The binder is to disperse and hold the display material, and may be a material having a translucent property and an appropriate strength. The materials of the binder may include resins such as epoxy resin, acrylic resin, urethane resin, polyester resin, polyamide resin, olefin resin, vinyl resin, phenyl resin, and urea resin, glass, and ceramic. The binder may not be necessarily colorless, and has a desired color in view of the display effect. The binder may be preferably soft to some extent, because it deforms at the time of bonding to prevent air bubbles from remaining.

When the display material is in the solid phase, the display material can be dispersed into the binder by agitating and mixing the display material into the binder or its solution. If the display material is in the liquid phase, the display material can be dispersed into the binder by the following methods. That is,
(1) a method of forming micro-capsules containing the display material as a core material and dispersing the micro-capsules into the binder,
(2) a method of dispersing the display material into an incompatible binder solution and drying, and
(3) a method of dissolving the binder and the display material uniformly using solving means such as solvent or heating, and then making the phase separation of the display material and the binder by applying an external stimulus such as heat or light.

As the method (1) for producing the micro-capsules, there are provided various interface deposition methods, including a phase separation method, an in-liquid drying method, a melt dispersion cooling method, a spray drying method, a pan coating method, an in-gas suspension coating method, and a powder bed method, and other interface reaction methods, including an interfacial polymerization method, an in situ polymerization method, and an in-liquid hardening coating method. The materials of a micro-capsule shell may include gelatin-gum arabics, polyvinyl alcohol base, polyamide base, polyurethane, polyurea base, and urea formaldehyde base.

The method (2) involves dispersing a non-aqueous display material such as liquid crystal material into an aqueous solution of aqueous polymer such as polyvinyl alcohol, alkyl cellulose, or gelatin, coating it and drying, as one example.

As the phase separation method (3), there are
(a) a solvent inducing phase separation method: dissolving the resin and the display material into a cosolvent to produce a homogeneous solution, and inducing the phase separation by solvent drying,
(b) a heat inducing phase separation method: heating and melting the resin and the display material to produce a homogeneous solution, and inducing the phase separation by cooling, and
(c) a polymerization phase separation method: initiating polymerization of a mixture solution of polymeric monomer or oligomer and the display material by light, heat, electron beam, or addition of a curing agent, and inducing the phase separation.

In an example (c), the binder may be employed in the form of its precursor, rather than the final composition. For example, the resin may be employed in the form of monomer or oligomer, and the glass or ceramic may be employed in the form of sol-gel material such as metal alkoxide. In this case, there is a need for having a process of applying the binder on the substrate and converting the precursor to the final composition through an appropriate curing process such as heating, ultraviolet radiation or electron beam radiation.

The formation methods of the display layer 13 may include the printing methods such as screen printing, relief printing, intaglio printing, planographic printing, and flexography, and the coating methods such as spin coating, bar coating, dip coating, roll coating, knife coating, and die coating.

The display layer 13 does not need to directly contact with the substrate 11a, as far as it is formed above the substrate 11a. For example, the electrode 12a may exist between the display layer 13 and the substrate 11a as in this example. Various display function layers may be provided, such as an anchor coat layer between the display layer 13 and the front substrate 11a to increase the adhesion, and an insulating layer between the electrode 12a and the display layer 13 to prevent a short-circuit.

The light shielding layer 14 is provided to shield a transmitted light from the substrate 11b. Owing to this light shielding layer 14, it is possible to conceal air bubbles and avoid the effect of bubbles on the display, even if bubbles remain between the light shielding layer 14 and the substrate 11b. The wavelength range to be light-shielded is an entire visible wavelength area, and particularly, it is necessary to indicate a desired light shielding property in a wavelength range from 400 to 700 nm. Therefore, the light shielding layer 14 usually presents black. As the light shielding property, the optical density of transmitted light is at least 0.5 or more, and preferably 1 or more.

The material of the light shielding layer 14 is not specifically limited, as far as it is black. For example, it is possible to employ 1) a black coating agent in which a black pigment, namely, an organic pigment such as carbon black or aniline black, or an inorganic pigment such as CuO, MnO, $Cr_2O_3$, Fe—Cr pigment, or Cu—Fe—Mn pigment, is dispersed into the resin binder such as acrylic resin, epoxy resin, polyester resin, or polyurethane resin,
2) a resin colored with black dye, and
3) an evaporated film of black material such as carbon black.

The light shielding layer 14 must be formed such that no air bubbles remain on the display layer 13. The formation methods may include 1) a coating method of coating a resin coating agent colored with black pigment or black dye,
2) an evaporation method for evaporating the black coloring matter,
3) a method for forming a receiving layer on the display layer 13 and coloring it with a black dye, and
4) a method for transferring the light shielding layer 14 formed on another substrate to the display layer 13.

Among others, the coating method is superior in the productivity. On the one hand, the display material is typically subject to the physical or chemical damage by organic solvent, whereby the selection of solvent or dispersion medium for use in coating the light shielding layer 14 is important. By the damage, it is meant that the dispersion structure is broken or deteriorated by swelling and melting of the binder or shell material of micro-capsules, or the solvent or dispersion medium percolates through the display material to deteriorate the display performance. When the display material is liquid crystal, it is weak to organic solvent in particular, whereby this problem is remarkable.

As a result of examination, it has been found that the use of an aqueous coating agent as the solvent or dispersion medium is effective to reduce the damage. The aqueous coating agent contains at least 50% or more of water in the solvent composition. The solvent (auxiliary solvent) other than the water is not specifically limited, as far as it is compatible with the water. In view of the easiness of drying, the boiling point is preferably 200° C. or less. The auxiliary solvents may include alcohol such as ethanol, 2-propanol, and ethylene glycol, ester such as ethyl acetate and butyl acetate, ketone such as acetone and methyl-ethyl-ketone, and cellosolve such as ethyl cellosolve and cellosolve acetate.

When the light shielding layer 14 is formed from an aqueous coating agent, the binder is an aqueous resin, a water/organic solvent soluble resin, and water based emulsion, dispersion and latex.

The aqueous resins may include polyvinyl alcohol, alkyl cellulose such as methyl cellulose and ethyl cellulose, polyacrylate such as carboxymethyl cellulose, hydroxymethyl cellulose, hydroxypropyl cellulose, polyethylene imine, polyacrylic acid, polyacrylate, and polyacrylamide, polyethylene oxide, polyvinylpyrrolidone, starch, casein, glue, gelatin, gum arabic, guar gum, alginate, locust bean gum, carrageenan, tamarind, pectin, as well as various resins such as urethane resin, epoxy resin and acrylic resin having a hydrophilic group such as hydroxyl group, carboxyl group, sulfonic acid group, and amino group.

The water/organic solvent soluble resins may include ethylene-vinyl-alcohol copolymer, polyacrylamide, polyethylene imine, polyvinylpyrrolidone, polyglyceline, and various resins soluble in the water or organic solvent.

The examples of aqueous emulsion/dispersion/latex may include ethylene-vinyl acetate copolymer, ethylene-vinyl chloride copolymer, polyurethane, polyacrylate, styrene-butadiene rubber, and nitrile-butadiene rubber.

The materials of the adhesive layer 16 may include well-known adhesives such as acrylate, urethane, cyanoacrylate, silicone, and isoprene rubber, and ethylene-vinyl acetate copolymer. The types of adhesive may include two liquid curable type, heat curable type, moisture curable type, ultraviolet curable type, hot melt type, pressure sensitive type (pressure sensitive adhesive), but are not specifically limited. The adhesive layer 16 is formed by (1) a coating method for coating an adhesive on the light shielding layer 14 or the substrate 11b (photoconductive layer 15),
(2) a transfer method for transferring an adhesive applied on another base substance to the light shielding layer 14 or the substrate 11b (photoconductive layer 15), and
(3) an adhesive film method for sandwiching and adhering an adhesive formed into a film between the light shielding layer 14 and the substrate 11b (photoconductive layer 15).

In the coating method, it does not matter that the adhesive layer 4 is applied on either the substrate 11a or substrate 11b. However, the adhesive layer 4 is preferably applied on the substrate 11a or on the light shielding layer 14 from the viewpoint of filling up the adhesive into the roughness on the light shielding layer 14 to prevent air bubbles from remaining. The adhesive layer 16 colored black may be also employed to serve as the light shielding layer 14.

The bonding is a process for bonding the substrate 11a formed with the display function layers and the substrate 11b, using a pressure bonding method by applying pressure, a thermally bonding method by applying heat and pressure, or an adhesive method by applying adhesives. When the binder of the display layer 13, and the front substrate 11a or back substrate 11b are made of resin, the resin can be softened to decrease remaining bubbles by using the thermally bonding method. They may be bonded in a vacuum to avoid the entry of bubbles.

In the example as shown in FIG. 1, the photoconductive layer 15 as a switching element for driving the display layer 13 is formed on the substrate 11b. In addition, an active element such as a thin film transistor, a thin film diode, or an MIM (Metal-Insulator-Metal) element may be provided as the switching element. A function element such as the switching element may be provided on the substrate 11b to be bonded with the light shielding layer 14 in advance.

The example as shown in FIG. 1 is a display element of optically writing type. However, this invention is not limited thereto. For example, the stripe-like electrodes 12a and 12b may be processed to produce a display element of simple matrix type. Alternatively, an active element such as a thin film transistor, thin film diode, or MIM (Metal-Insulator-Metal) element may be disposed on the back substrate 11b to form a display element of active matrix driving type. Though the display element of voltage response type has been exemplified, this invention is effective for the display element including the display material of heat response type, to which writing is conducted by a thermal head or with laser beam.

A specific example of the display element 1 according to the first embodiment of the invention will be shown below. In this example, the display material was a cholesteric liquid crystal. The cholesteric liquid crystal was prepared by adding 12.8% of chiral agent R811 (made by Merk, Corp.) and 3.2% of chiral agent R1011 (made by Merk, Corp.) to a nematic liquid crystal E7 (made by Merk, Corp.). The cholesteric liquid crystal having a selective reflection of blue green color was obtained.

One part of polyisocyanate compound Takenate D-110N (made by Takeda Chemical Industries) and 100 parts of ethyl acetate were added to 10 parts of this cholesteric liquid crystal to prepare an oil phase composition. This oil phase composition was poured into 1000 parts of 1% polyvinylalcohol aqueous solution, and was agitated and emulsified to produce o/w emulsion with a diameter of about 10 µm. This emulsion was heated at 60° C. for three hours to produce micro-capsules with polyurethane as a wall material. After the micro-capsules were centrifuged and withdrawn, 12% polyvinylalcohol aqueous solution was added to have a micro-capsule liquid crystal coating agent.

Then, an ITO evaporated PET resin film, commercially available, was prepared as the substrate 11a and the electrode 12a. The micro-capsule liquid crystal coating agent was applied thereon to have a dried film thickness of 30 µm, using an applicator, to produce the display layer 13. The surface roughness of the display layer 13 was 0.65 µm in Ra, which is calculated as a mean value of the absolute values of deviation from the average film thickness.

A water dispersion body WA color black A01 (made by Dainichi Seika) of carbon black, commercially available, and a polyvinyl alcohol solution were mixed to prepare a black coating agent. This black coating agent was applied on the display layer 13 to have a dried film thickness of 3 µm, using the applicator, to form the light shielding layer 14. The surface roughness Ra of the light shielding layer 14 was 0.19 µm. As a result, the effect of reducing roughness could be confirmed.

Then, a two-liquid urethane based adhesive DICDRY (made by Dainippon Ink & Chemical industries) was applied on the light shielding layer 14 in 3 g/m$^2$ by the bar coat method to form the adhesive layer 16.

On the other hand, the ITO evaporated PET resin film, commercially available, was prepared as the substrate 11b and the electrode 12b. Then, three layers of a first charge generating layer, a charge transport layer and a second charge generating layer were formed thereon. First of all, alcohol solution of polyvinyl butyral resin with phthalocyanine pigment based charge generating material dispersed was spin coated to form the first charge generating layer having a thickness of 0.1 µm. Then, a chlorobenzene solution including diamine based charge transport material and polycarbonate resin was coated, using the applicator, to form the charge transport layer having a thickness of 3 µm. Finally, alcohol solution of polyvinyl butyral resin in which phthalocyanine pigment based charge generating material was dispersed was spin coated again to form the second charge generating layer having a thickness of 0.1 µm and form the photoconductive layer 15.

Finally, the substrate 11a and the substrate 11b prepared in the above manner were overlapped and bonded through a laminator heated at 110° C. to complete the display element 1.

A test for driving this display element 1 was conducted. As shown in FIG. 1, the electrodes 12a and 12b of the display element 1 were connected to the voltage applying portion 2 having a pulse generator and a high voltage amplifier. Also, a mask pattern having a light part and a dark part and the exposure portion 3 including an LED light source having a wavelength of 650 nm were prepared. The substrate 11b closely contacted with the mask pattern was exposed by the LED light source. In this test, an operator manually implemented the function of the control portion 4 for controlling the timing of the exposure and the application of voltage. The voltage applying portion 2 and the exposure portion 3 were manually operated. A burst pulse with a voltage of 300V and a frequency of 10 Hz was applied between the electrodes 12a and 12b for 200 ms to write an image of the master pattern onto the display element 1, while exposing the photoconductive portion 15. There was no roughness due to bubbles in the dark part of the written image and an excellent black display was produced. The display contrast ratio of the light part to the dark part was 12 to 1.

As a comparative example, instead of forming the light shielding layer 14 and the adhesive layer 16 on the display layer 13, the display element was formed in which the light shielding layer and the adhesive layer 16 was formed on the photoconductive layer 15 in this order. When an image of the mask pattern was written in a similar way to the example and a dark part of the image was observed, roughness caused by remaining bubbles was found. The display contrast ratio of the light part to the dark part was 10 to 1, which was inferior to the above example.

Second Embodiment

Figure 3:
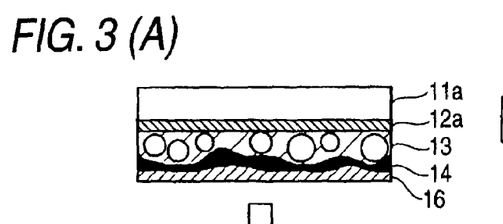
FIGS. 3(A)-3(C) are schematic process diagrams, in cross section, showing a display element according to a second embodiment of the invention.

FIG. 3 is a schematic process diagram, in cross section, showing a display element according to a second embodiment of the invention. In FIG. 3, the same or like parts are designated by the same numerals as in FIG. 1. In the second embodiment, the display element 1 of electric field writing type is shown. Namely, the photoconductive layer 15 is not provided.

On the substrate 11a, the electrode 12a, the display layer 13, the light shielding layer 14 and the adhesive layer 16 are laminated in the same manner as in the first embodiment, and as shown in FIG. 3(A). On the other hand, the electrode 12b is formed on the substrate 11b as shown in FIG. 3(B). The substrate 11a of FIG. 3(A) and the substrate 11b of FIG. 3(B) are bonded by the adhesive layer 16 to form the display element 1.

In the display element 1 of this construction, since the light shielding layer 14 is provided on the display layer 13, the excellent display quality can be obtained as with the first embodiment.

In the display element 1 as shown in FIG. 3, the electrodes 12a and 12b are provided on the entire face. Therefore, the display element 1 displays either a specific reflection color (e.g., white) or a color (e.g., black) of the light shielding layer 14 by applying a voltage to the electrodes 12a and 12b. For example, if either the electrode 12a or the electrode 12b, or both, are appropriately patterned, and a voltage is selectively applied to the patterned electrode 12a or 12b, the reflection color (e.g., white) and the transmitted color (e.g., black of the light shielding layer 14) can be displayed for every part of the display element 1.

Figure 4:
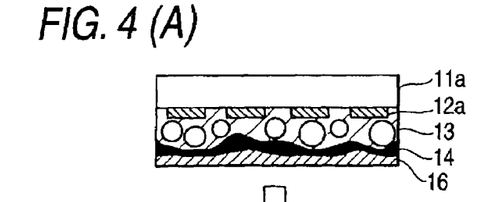
FIGS. 4(A)-4(C) are schematic process diagrams, in cross section, showing a variant of the display element according to the second embodiment of the invention.

FIG. 4 is a schematic process diagram, in cross section, showing a modified example of the display element according to the second embodiment of the invention. The display element can be driven partially by patterning the electrodes 12a and 12b, as above described. In this example, the electrodes 12a and 12b are patterned like a stripe and formed in the orthogonal directions. Herein, the stripe-like electrode 12a is formed on the substrate 11a in a direction orthogonal to the paper face as shown in FIG. 4(A), and the stripe-like electrode 12b is formed on the substrate 11b in a direction parallel to the paper face, as shown in FIG. 4(B).

The display element manufactured in this manner can display the reflection color (e.g., white) and the transmitted color (e.g., black of the light shielding layer 14) for every minute area where the electrodes 12a and 12b are crossed by selectively applying a voltage to the stripe-like electrodes 12a and 12b. This driving method is called a simple matrix type. This invention is also applicable to the display element of simple matrix type.

Third Embodiment

Figure 5:
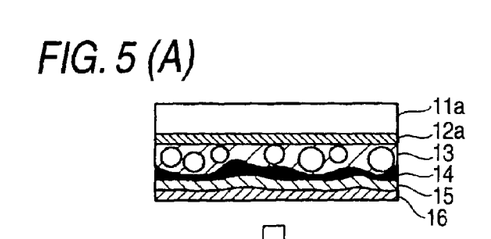
FIGS. 5(A)-5(C) are schematic process diagrams, in cross section, showing a display element according to a third embodiment of the invention.

FIG. 5 is a schematic process diagram, in cross section, showing a display element according to a third embodiment of the invention. In FIG. 5, the same or like parts are designated by the same numerals as in FIG. 1. In the first embodiment, the light shielding layer 14 as the display function layer is laminated on the display layer 13. However, the plurality of display function layers may be laminated on the display layer 13 and bonded with the substrate 11b. In this third embodiment, two display function layers are laminated on the display layer 13, and bonded with the substrate 11b.

The electrodes 12a and the display layer 13 are formed on the substrate 11a and the light shielding layer 14 and the photoconductive layer 15 are formed thereon, as shown in FIG. 5(A). The roughness on the surface of the display layer 13 are reduced by forming the light shielding layer 14, and further reduced by forming the photoconductive layer 15 to be almost flat in some cases.

The substrate 11a on which each layer is formed in this manner is provided with the adhesive layer 16, and bonded with the substrate 11b on which the electrode 12b is formed as shown in FIG. 5(B) to form the display element 1 as shown in FIG. 5(C). Since the surface of the photoconductive layer 15 is almost flat as above described, there are almost no air bubbles due to bonding and some roughness are filled up by the adhesive layer 16. As a result, the roughness on the display layer 13 hardly affect the display quality.

Figure 6:
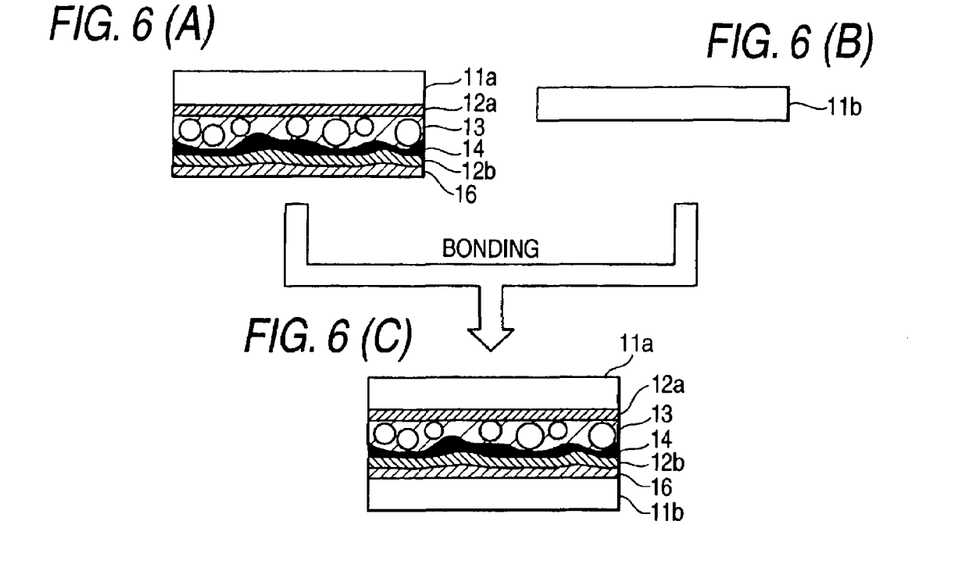
FIGS. 6(A)-6(C) are schematic process diagrams, in cross section, showing a variant of the display element according to the third embodiment of the invention.

FIG. 6 is a schematic process diagram, in cross section, showing a modified example of the display element according to the third embodiment of the invention. In FIG. 6, the same or like parts are designated by the same numerals as in FIG. 1. In this example as shown in FIG. 6, the photoconductive layer 15 is not formed as with the example as shown in FIGS. 3 and 4. In this case, the electrodes 12a and the display layer 13 are formed on the substrate 11a and the electrode 12b is formed thereon by an evaporation method or a coating method of the conductive ink. In this case, the roughness on the surface of the display layer 13 are reduced by forming the light shielding layer 14, and further reduced by forming the electrode 12b. The substrate 11a on which each layer is formed in this manner is provided with the adhesive layer 16, and bonded with the substrate 11b as shown in FIG. 5(B) to form the display element 1 as shown in FIG. 5(C).

In this example, even if air bubbles is present between the electrode 12b and the substrate 11b, the air bubbles do not affect the optical characteristics when referring the display and the generated electric field. As a result, the excellent display quality can be obtained. Accordingly, the bonding is made without worrying about the mixture of air bubbles. Also, it is not necessary to provide the adhesive layer 16 on the entire face.

Fourth Embodiment

Figure 7:
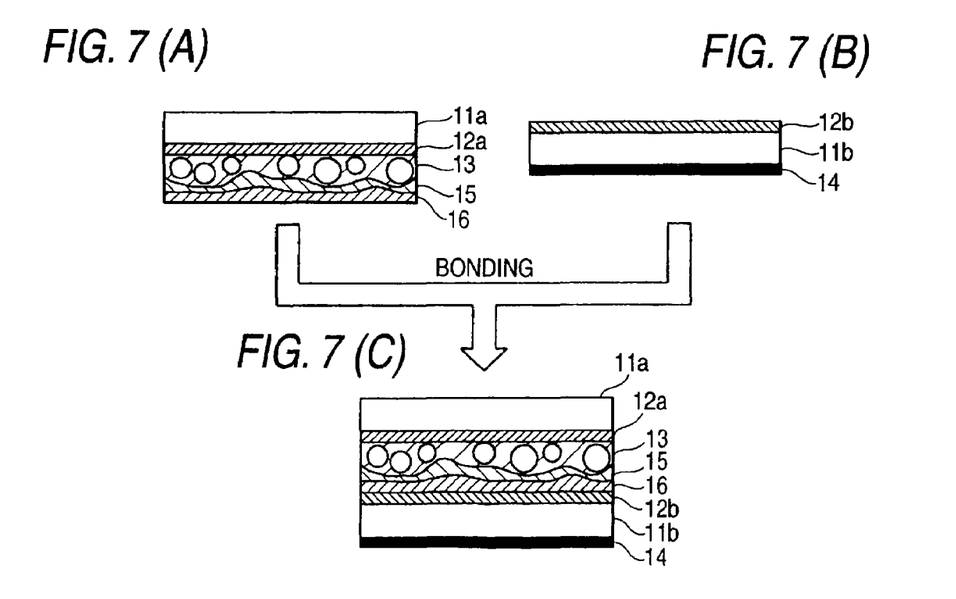
FIGS. 7(A)-7(C) are schematic process diagrams, in cross section, showing a display element according to a fourth embodiment of the invention.

FIG. 7 is a schematic process diagram, in cross section, showing a display element according to a fourth embodiment of the invention. In FIG. 7, the same or like parts are designated by the same numerals as in FIG. 1. In the first embodiment, the optical writing is performed from the back side. Therefore, the light shielding layer is provided between the photoconductive layer 15 and the display layer 13. In this fourth embodiment, the display element is configured to perform the optical writing from the front side. When the optical writing is performed from the front side, the light shielding layer 14 may be provided on the back side of the substrate 11b, for example.

The electrodes 12a and the display layer 13 are formed on the substrate 11a, and the photoconductive layer 15 is formed thereon, as shown in FIG. 7(A). Formation of the photoconductive layer 15 reduces the roughness on the surface of the display layer 13 to be almost flat.

The electrode 12b is provided on one face of the substrate 11b. The light shielding layer 14 is formed on the other face. The substrate 11b is bonded with the substrate 11a on which each layer is formed through the adhesive layer 16 while a surface of the substrate 11b on which the electrode 12b is formed is inside shown in FIG. 7(A). Thus, the display element 1 as shown in FIG. 7(C) can be obtained. Since the surface of the photoconductive layer 15 is almost flat as above described, there are almost no air bubbles due to bonding. Even if some roughness exist, the adhesive layer 16 fills up the roughness. Therefore, the roughness on the display layer 13 hardly affect the display quality.

Figure 8:
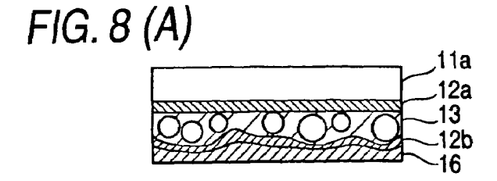
FIGS. 8(A)-8(C) are schematic process diagrams, in cross section, showing a variant of the display element according to the fourth embodiment of the invention.

FIG. 8 is a schematic process diagram, in cross section, showing a modified example of the display element according to the fourth embodiment of the invention. In FIG. 8, the same or like parts are designated by the same numerals as in FIG. 1. In this example as shown in FIG. 8, the photoconductive layer 15 is not formed as with the example shown in FIGS. 3 and 4. In this case, the electrodes 12a and the display layer 13 are formed on the substrate 11a, and the electrode 12b is formed thereon by an evaporation method or a coating method of the conductive ink. The roughness on the surface of the display layer 13 are reduced by forming the light shielding layer 14, and further reduced by forming the electrode 12b.

On the other hand, the substrate 11b is formed with the light shielding layer 14 on one face. The substrate 11b is bonded with the adhesive layer 16 on the substrate 11a on which each layer is formed, while an opposite surface of a surface where the light shielding layer 14 is formed is inside, as shown in FIG. 8(A). As a result, the display element 1 is formed as shown in FIG. 8(C). Since the formation of the electrode 12b reduces the roughness as described above, there are almost no air bubbles due to bonding. Even if some roughness exist, the adhesive layer 16 fills up the roughness. Therefore, the roughness on the display layer 13 hardly affect display quality.

In this example, a predetermined display content may be printed as the shielding layer 14 to form the display element 1. Thereby, when application of voltage to the electrodes 12a and 12b makes the display layer 13 be in a transmission state, the display content printed as the shielding layer 14 can be displayed. When the display layer 13 is made in a reflection state, the printed display content cannot be looked. Thereby, control can be performed to change the display.

In the above embodiments and modified examples, only one display layer 13 is provided. However, this invention is not limited thereto. This invention is also applicable to a color display element where a number of display layers 13 are laminated.

As will be apparent from the above description, with the invention, because other one or more display function layers are laminated on the display layer having the display material dispersed into the binder, it is possible to relieve the roughness on the surface of the display layer owing to the display function layers, suppressing the bubbles from arising due to roughness or eliminating the bubbles. Accordingly, there is the effect that the high quality display element can be provided by preventing the degradation in the display quality due to bubbles.

What is claimed is:

1. A method for manufacturing a display element comprising:
    forming a display layer in which a display material is dispersed in a binder, on a first substrate;
    forming at least one first display function layer on the display layer after the forming of the display layer;
    forming at least one second display function layer on a second substrate; and
    bonding the first substrate on which the display layer and the at least one first display function layer has been formed to the second substrate, on which the at least one second display function layer has been formed, with an adhesive layer that substantially fills a void between layers formed on the first substrate and the second substrate;
    wherein the first substrate and the second substrate each has at least one electrode,
    wherein the second display function layer includes a switching layer and a photoconductive layer, and
    wherein the first display function layer comprises a light shielding layer having a black color.

2. The method according to claim 1, wherein the display element includes:
    the first substrate;
    the second substrate disposed to be opposite to the first substrate; and
    the first display function layer and the display layer that implement a display function and are disposed between the first substrate and the second substrate.

3. The method according to claim 1, wherein the first display function layer is a different kind of layer from the second function layer.

4. The method according to claim 1, wherein the first display function layer includes a light shielding layer.

5. The method according to claim 4, wherein the forming of the first display function layer comprises applying an aqueous coating agent to the display layer formed on the first substrate, to form the light shielding layer.

6. The method according to claim 1, wherein the display layer is a layer in which a micro-capsule containing the display material is dispersed into the binder.

7. The method according to claim 6, wherein the display material is a cholestric liquid crystal.

8. The method according to claim 1, wherein the bonding comprises forming an adhesive layer by using an adhesive agent.

9. The method according to claim 1, wherein the forming of the first display function layer comprises applying a coating agent to the display layer.

10. The method according to claim 1, wherein the light shielding layer comprises at least one of a black coating agent, a resin colored with black dye, and an evaporated film of a black material.

11. A method for manufacturing a display element comprising:
    forming a first electrode on a first substrate;
    forming a display layer in which a display material is dispersed in a binder, on the first electrode;
    forming at least one first display function layer on the display layer after the forming of the display layer;
    forming a second electrode on a second substrate; and
    bonding the first substrate, on which the first electrode, the display layer, and the at least one first display function layer have been formed, with a second substrate on which the second electrode has been formed with an adhesive layer that substantially fills a void between layers formed on the first substrate and the second substrate,
    wherein:
    the first display function layer comprises a light shielding layer having a black color, and
    the light shielding layer comprises at least one of a black coating agent, a resin colored with black dye and an evaporated film of a black material.

12. A method for manufacturing a display element, comprising:
    providing a first substrate and a second substrate;
    forming a display layer in which a display material is dispersed in a binder, on the first substrate;
    forming a light shielding layer having a black color to coat a surface of the display layer after forming the display layer such that a void between the display layer and the light shielding layer to be formed is substantially filled;
    bonding the second substrate and the first substrate on which the display layer and the light shielding layer are formed, such that the display layer and the light shielding layer are disposed between the first substrate and the second substrate; and
    forming a photoconductive layer between the light shielding layer and the second substrate,
    wherein the first substrate and the second substrate each have at least one electrode to apply a voltage to the display layer.

13. The method according to claim 12, wherein forming the display layer comprises:
    applying the display layer on the first substrate; and drying the display layer after applying the display layer on the first substrate.

14. The method according to claim 12, wherein the light shielding layer has a property which shields substantially an entire visible wavelength ranging from 400 to 700 nm.

15. The method according to claim 12, wherein the display material comprises a micro-capsule including a cholesteric liquid crystal, and the binder comprises a resin solution.

16. A method for manufacturing a display element, comprising:
provided a first substrate and a second substrate;
forming a display layer in which a display material is dispersed in a binder, on the first substrate;
forming a light shielding layer having a black color by directly coating the surface of the display layer with a light shielding material having a black color after forming the display layer such that a void between the display layer and the light shielding layer to be formed is substantially filled; and
bonding the second substrate and the first substrate on which the display layer and the light shielding layer are formed, such that the display layer and the light shielding layer are disposed between the first substrate and the second substrate,
wherein the surface of the display layer with the light shielding material is disposed on the opposite face of the display layer, where the first substrate is disposed.

17. The method according to claim 16, wherein the light shielding material includes the aqueous coating agent having at least 50% or more of water in a solvent composition.

18. The method according to claim 16, wherein the display material comprises a micro-capsule including a cholesteric liquid crystal, and the binder comprises a resin solution.

19. The method according to claim 16, wherein the light shielding layer has a property which shields substantially an entire visible wavelength ranging from 400 to 700 nm.

20. The method according to claim 16, wherein forming the display layer comprises:
applying the display layer on the first substrate; and
drying the display layer after applying the display layer on the first substrate.

21. A method for manufacturing a display element, comprising:
providing a first substrate and a second substrate;
applying a display layer in which a display material is dispersed in a binder, on the first substrate;
drying the display layer after applying the display layer on the first substrate;
forming a light shielding layer having a black color on the display layer after drying the display layer;
bonding the second substrate and the first substrate on which the display layer and the light shielding layer are formed, such that the display layer and the light shielding layer are disposed between the first substrate and the second substrate; and
forming a photoconductive layer between the light shielding layer and the second substrate.

22. The method according to claim 21, wherein the first substrate and the second substrate each has at least one electrode to apply a voltage to the display layer.

23. A method for manufacturing a display element, comprising:
providing a first substrate and a second substrate;
applying a display layer in which a display material is dispersed in a binder, on the first substrate;
drying the display layer after applying the display layer on the first substrate;
forming a light shielding layer having a black color on the display layer after drying the display layer by directly coating a surface of the display layer by using a light shielding material having a black color such that a void between the display layer and the light shielding layer to be formed is substantially filled; and
bonding the second substrate and the first substrate on which the display layer and the light shielding layer are formed, such that the display layer and the light shielding layer are disposed between the first substrate and the second substrate.

24. The method according to claim 23, wherein the first substrate and the second substrate each have at least one electrode to apply a voltage to the display layer.

\* \* \* \* \*